United States Patent [19]
Hendrickson

[11] 3,968,930
[45] July 13, 1976

[54] DRIP IRRIGATION DEVICE

[76] Inventor: Ralph L. Hendrickson, 3649 Noble Ave. North, Robbinsdale, Minn. 55422

[22] Filed: Mar. 31, 1975

[21] Appl. No.: 563,721

[52] U.S. Cl. ............................... 239/107; 239/542
[51] Int. Cl.² .................................... B05B 15/02
[58] Field of Search ................. 239/106, 107, 542; 137/608; 285/14

[56] References Cited
UNITED STATES PATENTS

| | | | |
|---|---|---|---|
| 3,667,685 | 6/1972 | Rinkewick | 239/542 |
| 3,693,657 | 9/1972 | Olson | 137/608 |
| 3,792,588 | 2/1974 | Gilaad | 285/14 X |
| 3,806,036 | 4/1974 | Olson | 239/542 X |

FOREIGN PATENTS OR APPLICATIONS

| | | | |
|---|---|---|---|
| 1,523,331 | 3/1968 | France | 239/542 |

*Primary Examiner*—John J. Love
*Attorney, Agent, or Firm*—Dugger, Johnson & Westman

[57] ABSTRACT

A drip irrigation device comprising a connector for two lengths of hose which includes a flow restrictor for emitting a drip for use in irrigation. The device includes a core member having a central through passageway and an outer helical rib or thread providing an outer continuous restricted channel between the central passage and the exterior of the housing. An outer member surrounds the channel and can be moved independently of the core member to position clear of the rib to permit flushing the helical channel for the drip irrigation device without twisting or separating the two hose sections.

10 Claims, 4 Drawing Figures

DRIP IRRIGATION DEVICE

BACKGROUND OF THE INVENTION

1. Field of the Invention

The present invention relates to drip irrigation devices comprising flow restrictors for permitting a controlled drip flow for irrigation purposes.

2. Prior Art

In the prior art, various drip irrigation devices have been advanced. For example, U.S. Pat. No. 3,604,728 discloses a member with an outer helical thread forming a flow restriction to provide a drip fitting, but it does not provide for a central housing in the same manner as the present device.

Another type of drip irrigation device is shown in U.S. Pat. No. 3,791,587 which has threaded connections between two parts, but it cannot be unthreaded without twisting one of the hoses. U.S. Pat. No. 2,516,096 shows a drain fitting that permits removal for cleaning, but this device is not suited for drip irrigation where several drip fittings are positioned in series between lengths of hose.

A further self-cleaning type of flow restrictor is shown in U.S. Pat. No. 3,693,657 which has two tapered members that can be shifted axially for cleaning purposes.

SUMMARY OF THE INVENTION

The present invention relates to a flow restrictor fitting for use in drip irrigation which can be connected between two lengths of hose and when used in series with a plurality of lengths of hose provides means for irrigating areas by emitting small drips at each of the fittings to minimize waste of water.

As shown, a central core member has a central through opening, and has means at its opposite ends for connecting hoses to the ends. The central core member has a portion adjacent one end that is enlarged in outer diameter. This enlarged portion has a helical rib or thread defined on the outer surface thereof, and adjacent one end has an opening from the central passageway to the outer surface having the helical rib.

A shell or cover member is threadably mounted onto the central core member, and has a generally cylindrical inner surface that surrounds the helical rib and provides an enclosed helical flow restriction channel or passage. An opening is provided from the through passage of the core member to the helical rib so that water can flow in the recesses between the ribs along the length of the helix so that only a small, controlled drip of water will be emitted. The core member is of length so that the outer shell can be released from the core and slid axially along the core to a position so that it will clear substantially all of the helical rib and will permit the opening from the central passageway to the helical rib to be flushed for cleaning the channel defined by the rib and the opening from the central passageway. This can be done without twisting the hose sections to which the core is attached, or without breaking the line. This means that the flushing can be carried out quickly and conveniently.

The device is easily manufactured from plastic materials, and thus is low cost.

DESCRIPTION OF THE PREFERRED EMBODIMENTS

Figure 1:
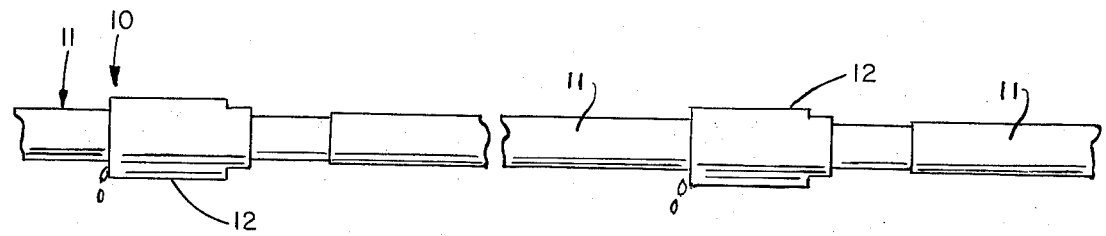
FIG. 1 is a typical side view of a plurality of drip fittings connected together with lengths of hose in a drip irrigation system.
Figure 2:
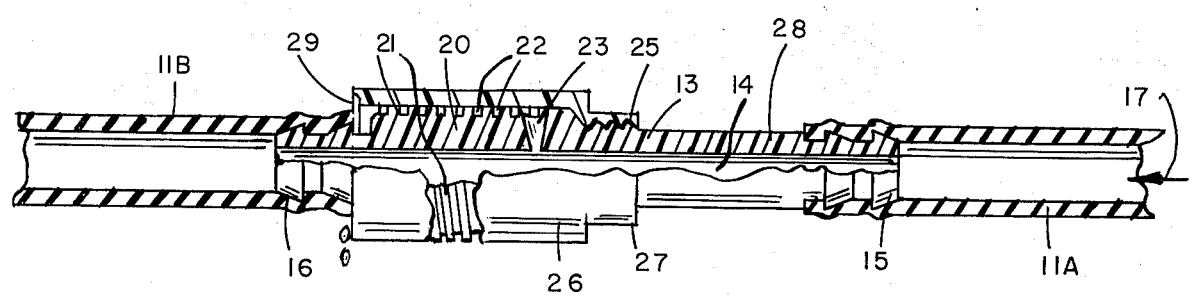
FIG. 2 is a vertical sectional view of a typical drip fitting.
Figure 3:
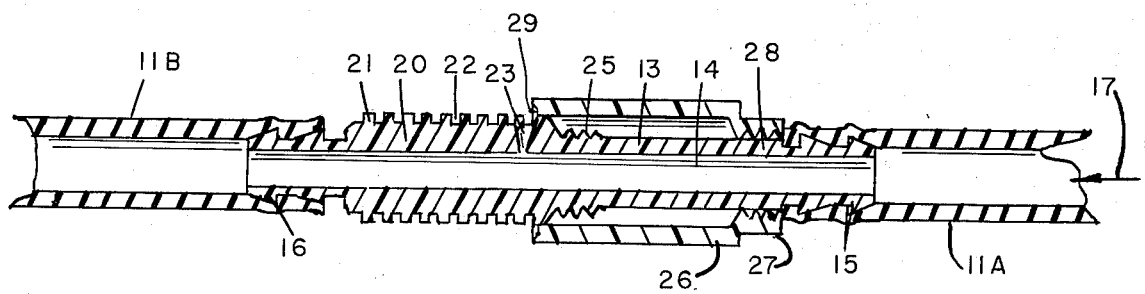
FIG. 3 is a view of the drip fitting showing an outer shell or cover moved to a position to permit flushing of the passageways of the fittings.

In FIG. 1, a drip irrigation hose assembly illustrated generally at 10 as shown includes a plurality of hose sections indicated generally at 11, positioned between individual drip emitter fitting assemblies 12. The drip emitter fitting assemblies, as shown in FIG. 2, includes a central core member 13, which has a central through passageway 14 defined therein, and has means at a first end 15 thereof for attaching a hose section 11A thereto, and has means at the second end 16 thereof for attaching another hose section 11B. The central passageway 14 thus forms a flow through channel for fluids flowing through the hose sections.

Water can flow through the hose section 11A in the direction as indicated by arrow 17, and thus through the internal passageway 14 to the hose section 11B. As shown, the core member 13 has an enlarged end portion 20 adjacent the end 16, and this enlarged portion has a rib formed into a helical thread member 21 on the outer surface thereof providing a helical passageway or channel 22 between adjacent rib members that is continuous from one end of the helix to the other. An opening 23 is provided in the wall of core 13 at the end of the helical rib opposite from the end 16. The opening 23 leads from the passageway 14 to the passageway 22 formed by the helical rib at the exterior of the core 13. This opening 23 as shown is generally conically shaped with the smallest cross section adjacent the passageway 14. The opening 23 expands in size toward the outer periphery of the enlarged portion 20 of the core 13.

A screw threaded portion indicated at 25 of smaller diameter than portion 20 is also provided adjacent the inlet end of the helical rib. This screw thread is used for holding an outer shell or sleeve 26 thereon. The shell 26 is an interior cylindrical surface that is of size to fit over the helical rib 21, and is of length to extend axially beyond the helical threads at the end 16. The shell 26 has a neck portion 27 that has threads mating with the threads 25. The neck may be provided with flat portions for a wrench fitting on the exterior.

The interior surface of the shell 26 generally closely fits the outer surfaces of the helical thread so that the passageway 22 is covered. Flow from the opening 23 through the helical passageway or channel 22 will follow the helix formed so that at the end of the core adjacent end 16, a drip will be emitted. The amount of flow can be controlled by the cross section size of the channel 22 and the length of the channel.

It also should be noted that the core 13 has a shank section 28 extending axially between the threads 25 and the end 15. The shank is of sufficient length so that the shell 26 can be unthreaded from the threads 25 and slid axially toward the end 15 a sufficient distance so that the end portion 29 substantially clears the opening 23 to permit a substantially free discharge of water from the interior passageway 14 to the exterior of the unit through opening 23. This will permit flushing the opening 23, and also by moving the sleeve or shell 26 partially over rib 21 the passageway 22 will also be flushed as the shell 26 is moved. Foreign material can thus be cleaned out so that if the device plugs up it can be easily cleaned.

Figure 4:
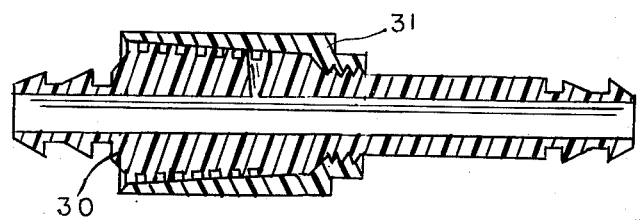
FIG. 4 is a sectional view of a modified drip fitting having a tapered surface on the central member to permit ease of removal of the outer shell.

In FIG. 4 a modified device includes a core member 30 that has a tapered outer surface mating with a complementary tapered inner surface of a sleeve 31. The tapered surfaces separate as the sleeve or shell 31 is unthreaded to facilitate removal of the shell and avoid binding of the parts. The amount of taper is very slight, but the clearance between the shell and the outer surface of the ribs on core 30 increases as soon as the shell 31 is backed off. When the parts 30 and 31 are assembled the modified device works in the same manner as the previous form of the invention to provide a drip flow for irrigation.

The flow restrictor is easily formed from plastic or other suitable material, and once assembled to the hose sections 11A and 11B, the flow passageways can be cleaned without twisting the hoses, or without separating or breaking the irrigation line. In this manner water under pressure can remain in the line while the individual drip emitter assemblies 12 are being cleaned. The fittings are connected in series and have simple attaching means for connecting the hose lengths.

The cleaning operation is positive, and the reassembly of the devices is also positive. That is, once the shell 26 (or 31) is threaded into place on the core it is certain that the drip will be controlled in volume and that the shell will not be moved accidently as can happen if the parts merely telescope without positive fastening.

What is claimed is:

1. A device for providing a restricted flow of a fluid comprising a core having opposite ends, means to attach the core member to a source of a fluid, said core member having an interior passageway carrying said fluid, a discharge passageway leading from the interior passageway of said core member to the exterior thereof, and a housing member overlying portions of said core member when in a first position, means cooperating between said housing member and the exterior of said core member to define an enclosed restricted flow path from said discharge passageway to atmosphere, said core member and said housing being of relative length so that said housing can be shifted axially relative to said core member to a second position where substantially all of said restricted flow path is uncovered for cleaning while said housing is located between the ends of the core member and the core member is attached to the source of fluid.

2. The combination of claim 1 wherein said means defining a restricted flow path comprises a helical channel defined in one of said members, and said discharge passageway comprising an aperture that tapers to a larger size in direction from the interior passageway toward the exterior of the core member.

3. The device of claim 2 wherein said core member has a first portion of greater diameter than other portions and said helical channel is formed on the exterior surface of said first portion of said core member.

4. The device of claim 1 and means to connect hose means at each end of said core member, and said interior passageway being a through passageway, and thread means to secure the housing member to the core member in said first position.

5. The device of claim 1 and means to secure said core member and said housing member together in the first position of the housing member.

6. The device of claim 5 wherein said restricted flow path comprises a channel defined on the outer surface of one portion of said core member, said housing member being a tubular member overlying said channel.

7. A flow restrictor fitting for drip irrigation including a first member having a first portion and a second portion axially spaced from the first portion, said first member having an interior through passageway defined in said first member and an aperture leading from said passageway to the exterior of said second portion, a second member having a surface facing the exterior of said second portion, means between said second member and said second portion cooperating to define a restricted flow path extending from said aperture to a second axially spaced position on said first member, said second member being axially shiftable relative to said first member, and means to attach liquid carrying hose members to opposite ends of said first member, said means to attach being positioned to permit axial shifting of the second member relative to the first member to position where the second member is overlying said first portion and the flow path is substantially unrestricted to permit flushing the aperture and flow path when hose members are connected to the means to attach.

8. The device of claim 7 wherein said restricted flow path comprises a helical channel defined on the exterior of said first member.

9. The device of claim 7 wherein said first member is a unitary member and the second portion is of larger outside size than the first portion of the first member and said second member is a tubular member which surrounds said first member.

10. The device of claim 8 wherein said second portion and said second member have mating surfaces which expand in a direction extending away from said first portion.

* * * * *